US010972246B2

United States Patent
Rico Alvarino et al.

(10) Patent No.: US 10,972,246 B2
(45) Date of Patent: Apr. 6, 2021

(54) SOUNDING REFERENCE SIGNAL (SRS) TRANSMISSION PROTOCOL FOR AN UPLINK PILOT TIME SLOT

(71) Applicant: QUALCOMM Incorporated, San Diego, CA (US)

(72) Inventors: Alberto Rico Alvarino, San Diego, CA (US); Le Liu, Fremont, CA (US); Lai Wei, Boulder, CO (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/503,800

(22) Filed: Jul. 5, 2019

(65) Prior Publication Data

US 2020/0044807 A1 Feb. 6, 2020

Related U.S. Application Data

(60) Provisional application No. 62/714,350, filed on Aug. 3, 2018.

(51) Int. Cl.
*H04L 5/00* (2006.01)
*H04W 72/04* (2009.01)
*H04W 72/00* (2009.01)

(52) U.S. Cl.
CPC ......... *H04L 5/0051* (2013.01); *H04W 72/005* (2013.01); *H04W 72/0413* (2013.01); *H04W 72/0446* (2013.01)

(58) Field of Classification Search
CPC .............. H04L 5/0051; H04W 72/005; H04W 72/0413; H04W 72/0446
See application file for complete search history.

(56) References Cited

U.S. PATENT DOCUMENTS

2015/0092637 A1* 4/2015 Yang .................... H04L 5/16 370/296
2017/0195890 A1* 7/2017 Chen .................... H04L 5/001
(Continued)

OTHER PUBLICATIONS

Huawei Hisilicon: "SRS Enhancement for Supporting Higher Data Rates", 3GPP TSG RAN WG 1 Meeting #87, 3GPP Draft; R1-1611889, 3rd Generation Partnership Project (3GPP), Mobile Competence Centre; 650, Route Des Lucioles; F-06921 Sophia-Antipolis Cedex; France; vol. RAN WG1, No. Reno, USA; Nov. 14, 2016-Nov. 18, 2016; Nov. 13, 2016 (Nov. 13, 2016), 5 Pages, XP051175856, Retrieved from the Internet: URL: https://www.3gpp.org/ftp/Meetings_3GPP_SYNC/RAN1/Docs/ [retrieved on Nov. 13, 2016], Section 3 and 4.
(Continued)

*Primary Examiner* — Benjamin H Elliott, IV
(74) *Attorney, Agent, or Firm* — Patterson + Sheridan, LLP

(57) ABSTRACT

Certain aspects of the present disclosure provide apparatus and method for wireless communication. For example, the method generally includes receiving signaling indicating a first subframe configuration, the first subframe configuration corresponding to a subframe with a first number of symbols in an uplink pilot time slot (UpPTS), receiving signaling indicating a second configuration, the second configuration indicating a second number of symbols in the UpPTS, generating a frame comprising the UpPTS having the first number of symbols corresponding to the first subframe configuration, the UpPTS including one or more SRSs corresponding to the second configuration, and transmitting the frame comprising the UpPTS.

18 Claims, 11 Drawing Sheets

1300

| | subframe index *n* | | | | | | | | | | | | |
|---|---|---|---|---|---|---|---|---|---|---|---|---|---|
| | 0 | 1 | | | | 2 | 3 | 4 | 5 | 6 | | | | 7 | 8 | 9 |
| | | 1st symbol of UpPTS | 2nd symbol of UpPTS | 3rd symbol of UpPTS | 4th symbol of UpPTS | | | | | 1st symbol of UpPTS | 2nd symbol of UpPTS | 3rd symbol of UpPTS | 4th symbol of UpPTS | | | |
| $k_{SRS}$ in case UpPTS length of 4 symbols | | 0 | 1 | 2 | 3 | | | | | 5 | 6 | 7 | 8 | | | |
| $k_{SRS}$ in case UpPTS length of 2 symbols | | | | 2 | 3 | | | | | | | 7 | 8 | | | |

(56) References Cited

U.S. PATENT DOCUMENTS

| | | | | |
|---|---|---|---|---|
| 2017/0215198 A1* | 7/2017 | Chen | .................. | H04L 5/001 |
| 2018/0323917 A1* | 11/2018 | Um | .................. | H04W 16/14 |
| 2018/0331797 A1* | 11/2018 | Wang | .................. | H04L 5/1469 |
| 2018/0351713 A1* | 12/2018 | Wang | .................. | H04L 5/0048 |
| 2019/0260612 A1* | 8/2019 | He | .................. | H04W 72/04 |
| 2020/0044807 A1* | 2/2020 | Rico Alvarino | ...... | H04L 5/0092 |

OTHER PUBLICATIONS

International Search Report and Written Opinion—PCT/US2019/040786—ISA/EPO—dated Oct. 28, 2019.
Samsung: "Discussion on SRS Capacity Improvement Options", 3GPP TSG RAN WG 1 Meeting #82bis, 3GPP Draft; R1-155485,Discussion on SRS Capacity Improvement, 3rd Generation Partnership Project (3GPP), Mobile Competence Centre, 650, Route Des Lucioles; F-06921 Sophia-Antipolis Cedex, France, vol. RAN WG1, No. Malmo, Sweden; Oct. 5, 2015-Oct. 9, 2015, Sep. 25, 2015 (Sep. 25, 2015), pp. 1-5, XP051021285.

* cited by examiner

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $(1+X) \cdot 2192 \cdot T_s$ | $(1+X) \cdot 2560 \cdot T_s$ | $7680 \cdot T_s$ | $(1+X) \cdot 2192 \cdot T_s$ | $(1+X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2+X) \cdot 2192 \cdot T_s$ | $(2+X) \cdot 2560 \cdot T_s$ |
| 5 | $6592 \cdot T_s$ | $(2+X) \cdot 2192 \cdot T_s$ | $(2+X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | - | - | - |
| 9 | $13168 \cdot T_s$ | $13152 \cdot T_s$ | $12800 \cdot T_s$ | - | - | - |
| 10 | $13168 \cdot T_s$ | | | - | - | - |

| | subframe index n | | | | | | | | | | | |
|---|---|---|---|---|---|---|---|---|---|---|---|---|
| | 0 | | 1 | 2 | 3 | 4 | 5 | 6 | | 7 | 8 | 9 |
| | 1st symbol of UpPTS | 2nd symbol of UpPTS | | | | | | 1st symbol of UpPTS | 2nd symbol of UpPTS | | | |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

FIG. 10

| | subframe index n | | | | | | | | | | | | | | |
|---|---|---|---|---|---|---|---|---|---|---|---|---|---|---|---|
| | 0 | | | | 1 | 2 | 3 | 4 | 5 | | | | 6 | 7 | 8 | 9 |
| | 1st symbol of UpPTS | 2nd symbol of UpPTS | 3rd symbol of UpPTS | 4th symbol of UpPTS | | | | | 1st symbol of UpPTS | 2nd symbol of UpPTS | 3rd symbol of UpPTS | 4th symbol of UpPTS | | | | |
| $k_{SRS}$ in case UpPTS length of 4 symbols | 0 | 1 | 2 | 3 | | | | | 5 | 6 | 7 | 8 | | | | |
| $k_{SRS}$ in case UpPTS length of 2 symbols | 2 | 3 | | | | | | | 7 | 8 | | | | | | |

FIG. 12

| | subframe index $n$ | | | | | | | | | |
|---|---|---|---|---|---|---|---|---|---|---|
| | 0 | | 1 | | 2 | 3 | 4 | 5 | 6 | | 7 | 8 | 9 |
| | 5th symbol of UpPTS | 6th symbol of UpPTS | 5th symbol of UpPTS | 6th symbol of UpPTS | | | | | | | | |
| $k_{SRS}$ in case UpPTS length of 6 | 0 | 1 | | | 2 | 3 | 4 | | 5 | 6 | 7 | 8 | 9 |

FIG. 13

| | subframe index $n$ | | | | | | | | | | | | |
|---|---|---|---|---|---|---|---|---|---|---|---|---|---|
| | 0 | | | | 1 | 2 | 3 | 4 | 5 | 6 | | | |
| | 1st symbol of UpPTS | 2nd symbol of UpPTS | 3rd symbol of UpPTS | 4th symbol of UpPTS | | | | | | 1st symbol of UpPTS | 2nd symbol of UpPTS | 3rd symbol of UpPTS | 4th symbol of UpPTS |
| $k_{SRS}$ in case UpPTS length of 4 symbols | 0 | 1 | 2 | 3 | | | | | | 5 | 6 | 7 | 8 |
| $k_{SRS}$ in case UpPTS length of 2 symbols | | | 2 | 3 | | | | | | | | 7 | 8 |

SOUNDING REFERENCE SIGNAL (SRS) TRANSMISSION PROTOCOL FOR AN UPLINK PILOT TIME SLOT

CROSS-REFERENCE TO RELATED APPLICATIONS

This application claims benefit of U.S. Provisional Patent Application Ser. No. 62/714,350, filed Aug. 3, 2018, which is expressly incorporated herein by reference in its entirety.

FIELD

The present disclosure relates generally to communication systems, and more particularly, to methods and apparatus for performing sounding operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of eNBs that can support communication for a number of user equipments (UEs). A UE may communicate with an eNB via the downlink and uplink. The downlink (or forward link) refers to the communication link from the eNB to the UE, and the uplink (or reverse link) refers to the communication link from the UE to the eNB.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication. The method generally includes receiving signaling indicating a first subframe configuration, the first subframe configuration corresponding to a subframe with a first number of symbols in an uplink pilot time slot (UpPTS), receiving signaling indicating a second configuration, the second configuration indicating a second number of symbols in the UpPTS, generating a frame comprising the UpPTS having the first number of symbols corresponding to the first subframe configuration, the UpPTS including one or more sounding reference signals (SRSs) corresponding to the second configuration, and transmitting the frame comprising the UpPTS.

Certain aspects of the present disclosure provide an apparatus for wireless communication. The apparatus generally includes a receiver configured to receive signaling indicating a first subframe configuration, the first subframe configuration corresponding to a subframe with a first number of symbols in a UpPTS, and receive signaling indicating a second configuration, the second configuration indicating a second number of symbols in the UpPTS, a processing system configured to generate a frame comprising the UpPTS having the first number of symbols corresponding to the first subframe configuration, the UpPTS including one or more SRSs corresponding to the second configuration, and a transmitter configured to transmit the frame comprising the UpPTS.

Certain aspects of the present disclosure provide a computer-readable medium having instructions stored thereon to cause an apparatus to receive signaling indicating a first subframe configuration, the first subframe configuration corresponding to a subframe with a first number of symbols in a UpPTS, receive signaling indicating a second configuration, the second configuration indicating a second number of symbols in the UpPTS, generate a frame comprising the UpPTS having the first number of symbols corresponding to the first subframe configuration, the UpPTS including one or more SRSs corresponding to the second configuration, and transmit the frame comprising the UpPTS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 is a table indicating information regarding sounding reference signal (SRS) transmissions for an uplink pilot time slot (UpPTS).

FIGS. 9 and 10 are tables representing parameters indicating one or more symbols in UpPTS to be assigned for SRS transmission.

FIGS. 12 and 13 are tables representing parameters indicating symbols in UpPTS to be assigned for SRS transmission for a special subframe configuration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
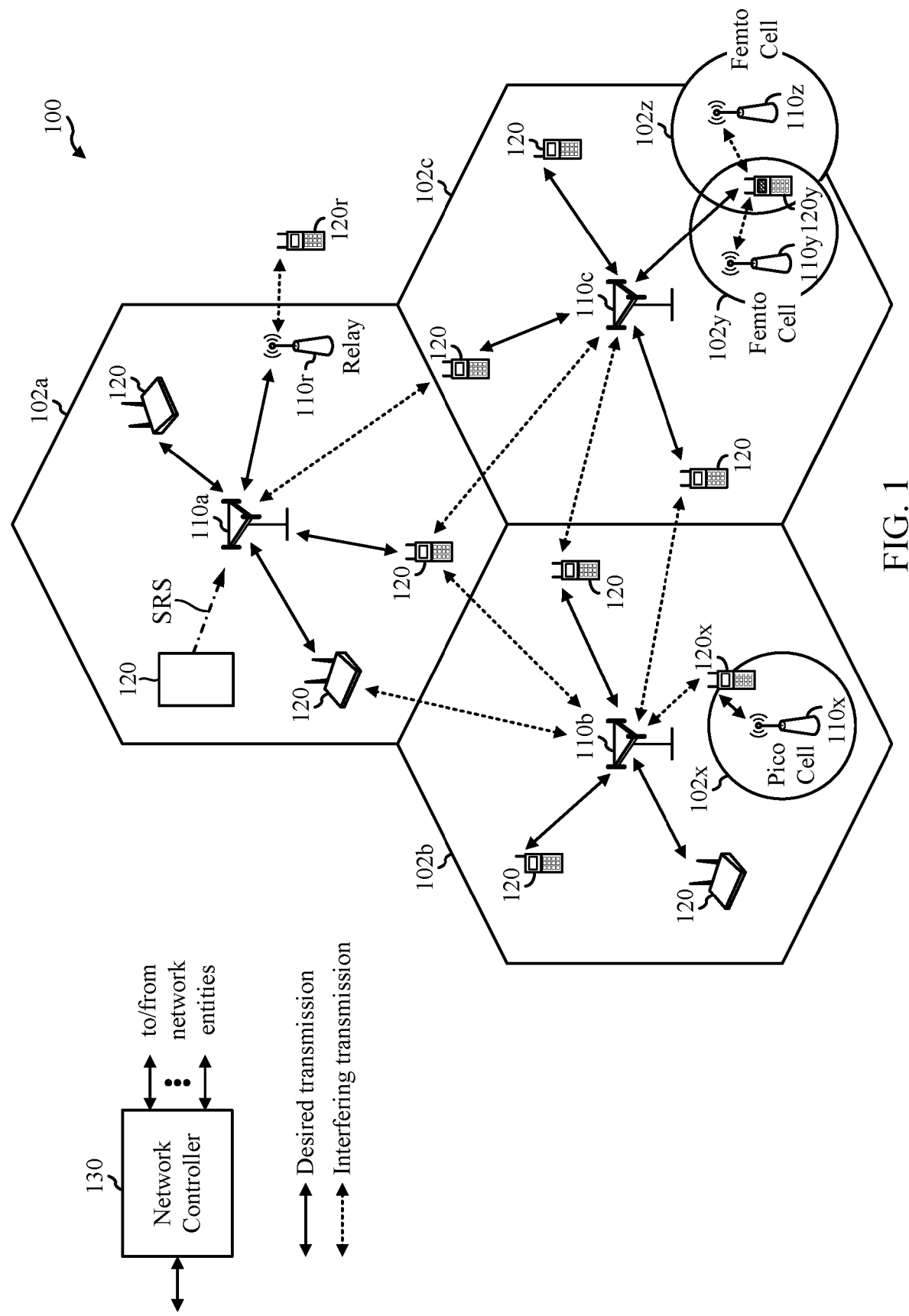
FIG. 1 is a block diagram conceptually illustrating an example telecommunications system, according to certain aspects of the present disclosure.

Aspects of the present disclosure provide apparatus, methods, processing systems, and computer-readable medium for performing sounding operations. For example, certain aspects provide techniques for assigning symbols in an uplink pilot time slot (UpPTS) for sounding reference signal (SRS) transmission when communicating using a special subframe configuration that sets a fixed symbol length (e.g., 6-symbols) for the UpPTS.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Communications System

FIG. 1 illustrates an example wireless network 100 in which aspects of the present disclosure may be performed.

The system illustrated in FIG. 1 may be, for example, a long term evolution (LTE) network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, transmission reception points (TRPs), etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

Figure 2:
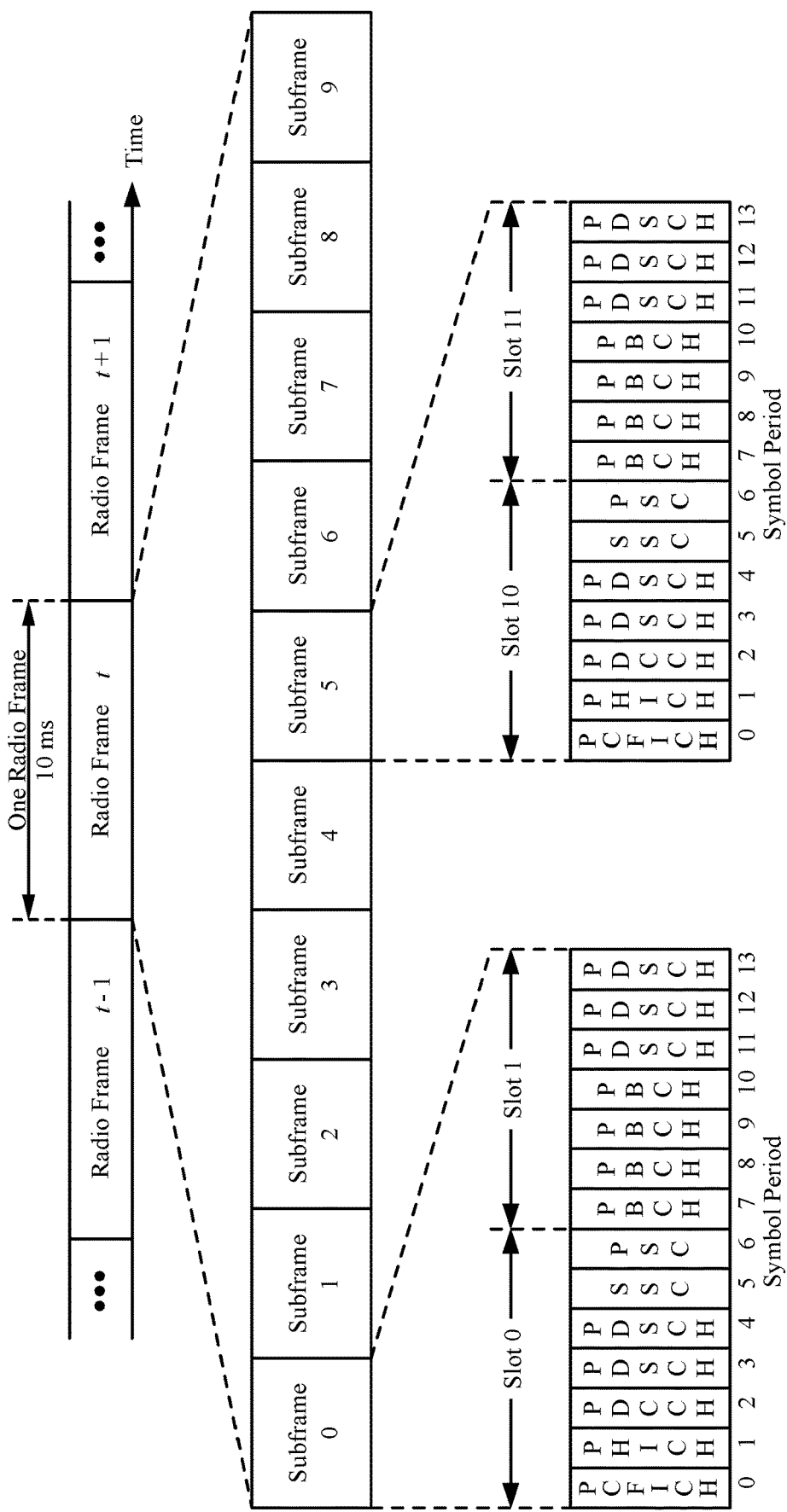
FIG. 2 is a block diagram conceptually illustrating an example downlink frame structure in a telecommunications system, according to certain aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of sub-frame 0. The PBCH may carry certain system information.

The eNB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNB may send a Physical Hybrid Automatic Retransmission (HARQ) Indicator Channel (PHICH) and a Physical Downlink Control Channel (PDCCH) in the first M symbol periods of each sub-frame (M=3 in FIG. 2). The PHICH may carry information to support HARQ. The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
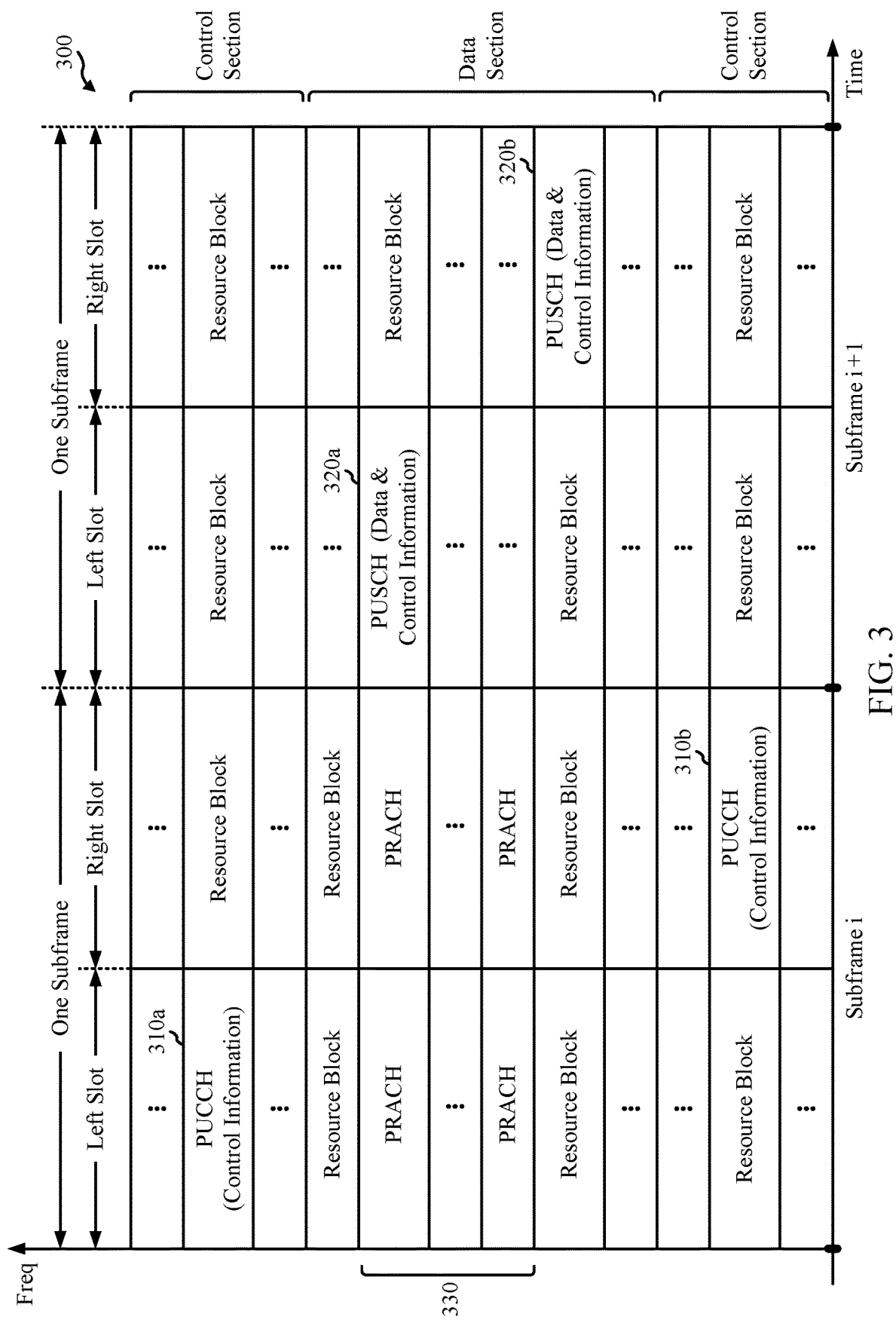
FIG. 3 is a diagram illustrating an example uplink frame structure in a telecommunications system, according to certain aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks $310a$, $310b$ in the control section to transmit control information to an eNB. The UE may also be assigned resource blocks $320a$, $320b$ in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
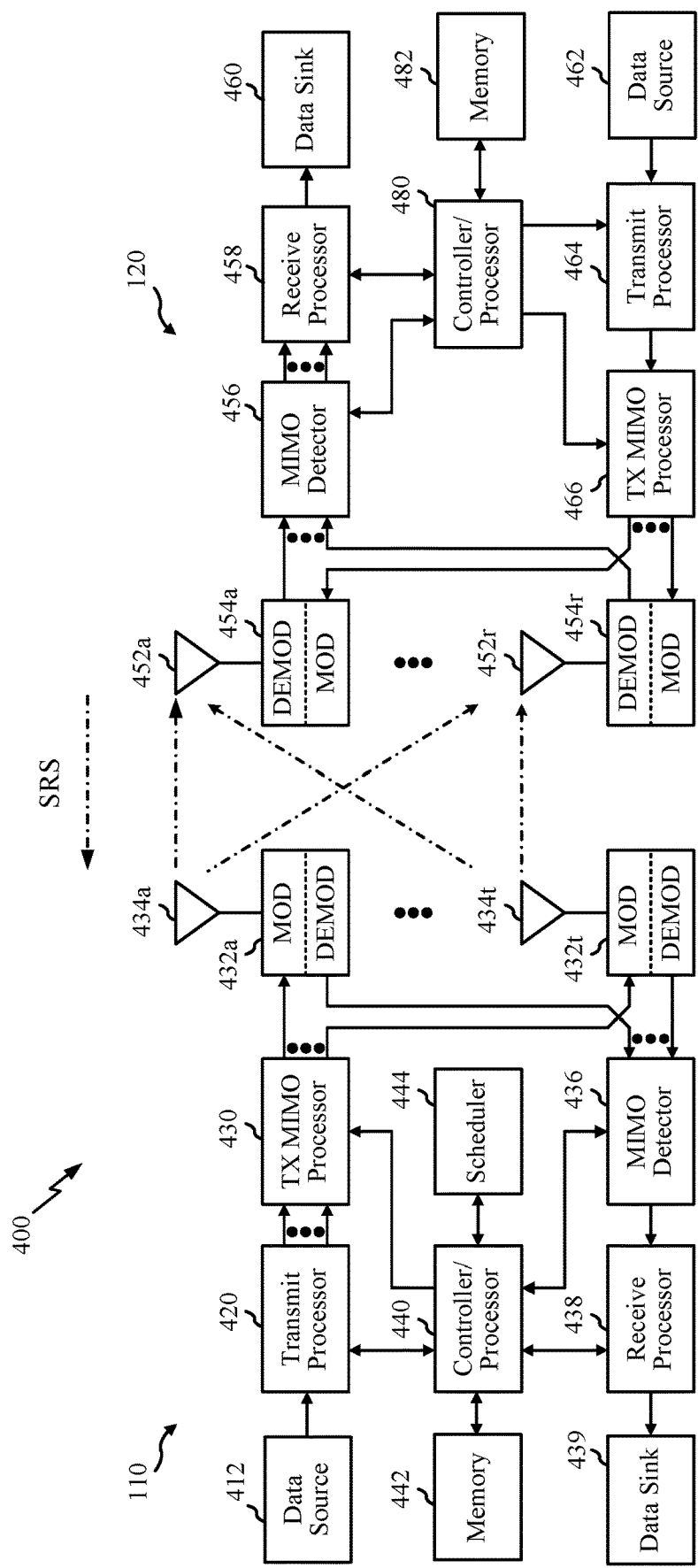
FIG. 4 is a block diagram conceptually illustrating a design of an example eNodeB and user equipment (UE), according to certain aspects of the present disclosure.

FIG. 4 illustrates example components of the base station/eNB 110 and UE 120 illustrated in FIG. 1, which may be used to implement aspects of the present disclosure. One or more components of the AP 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the eNB 110 may be used to perform the operations described herein.

FIG. 4 shows a block diagram 400 of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas $434a$ through $434t$, and the UE 120 may be equipped with antennas $452a$ through $452r$.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) $432a$ through $432t$. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal.

Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated herein, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
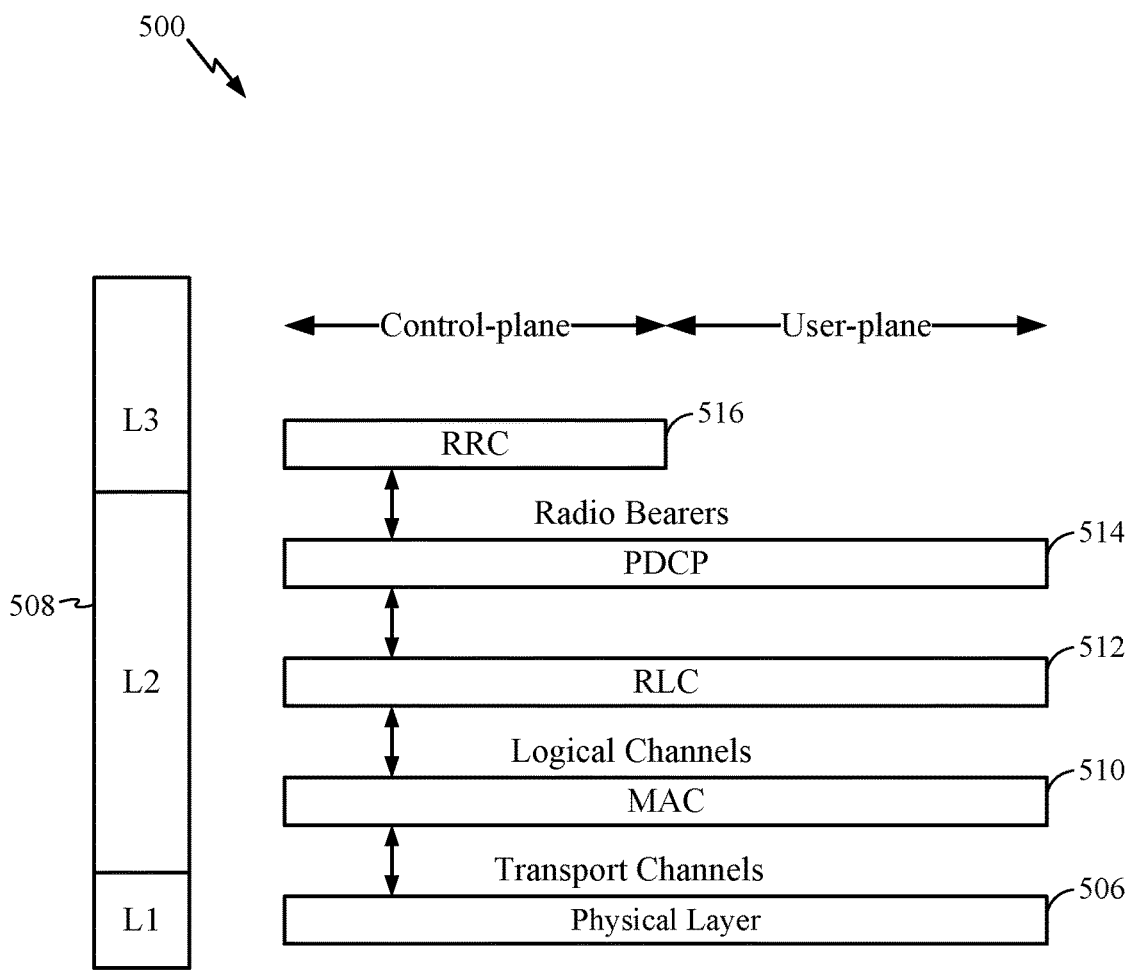
FIG. 5 is a diagram illustrating an example radio protocol architecture for the user and control planes, according to certain aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the packet data network (PDN) gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
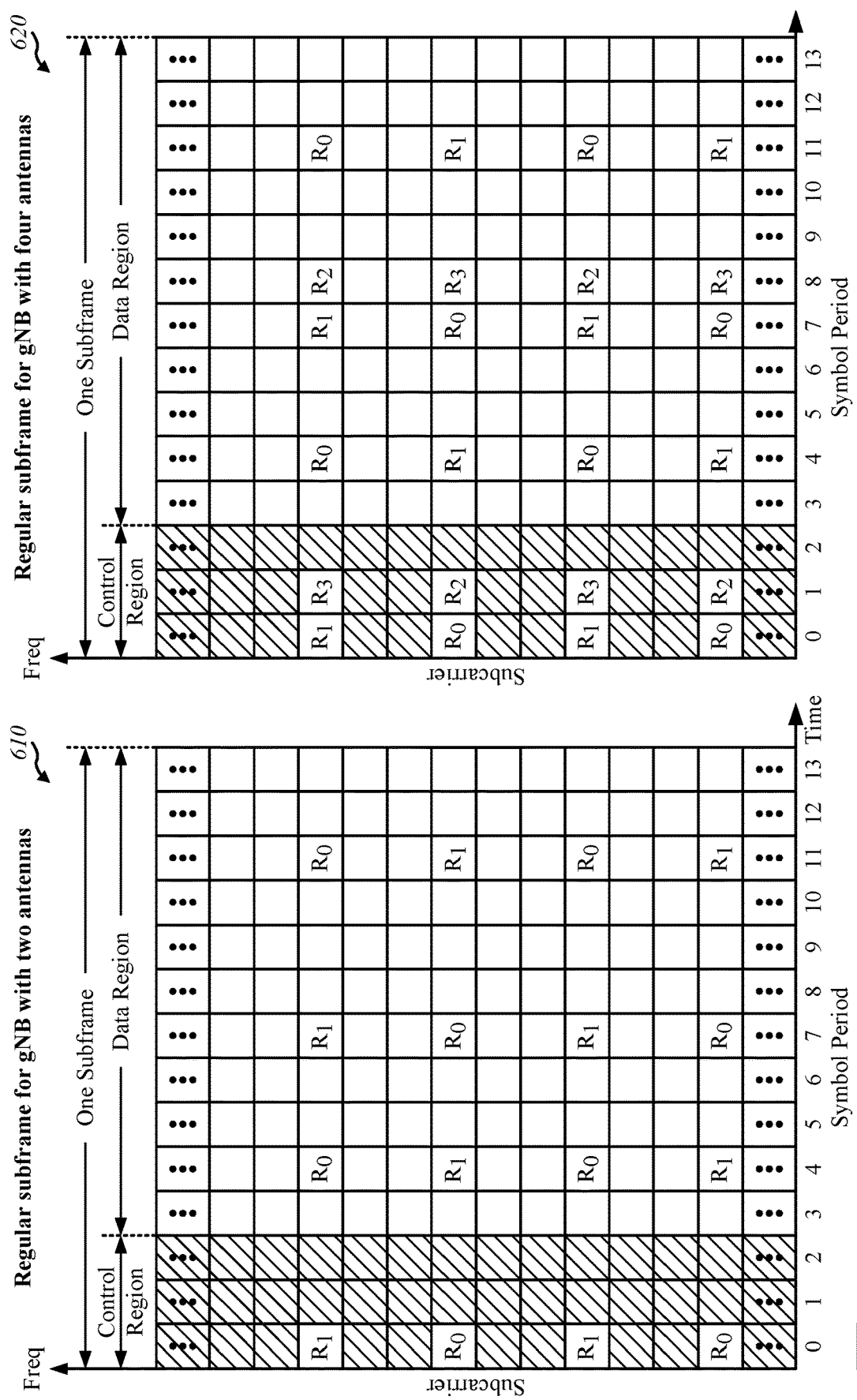
FIG. 6 illustrates an example subframe resource element mapping, according to certain aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different eNBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Carrier Aggregation

Figure 7A:
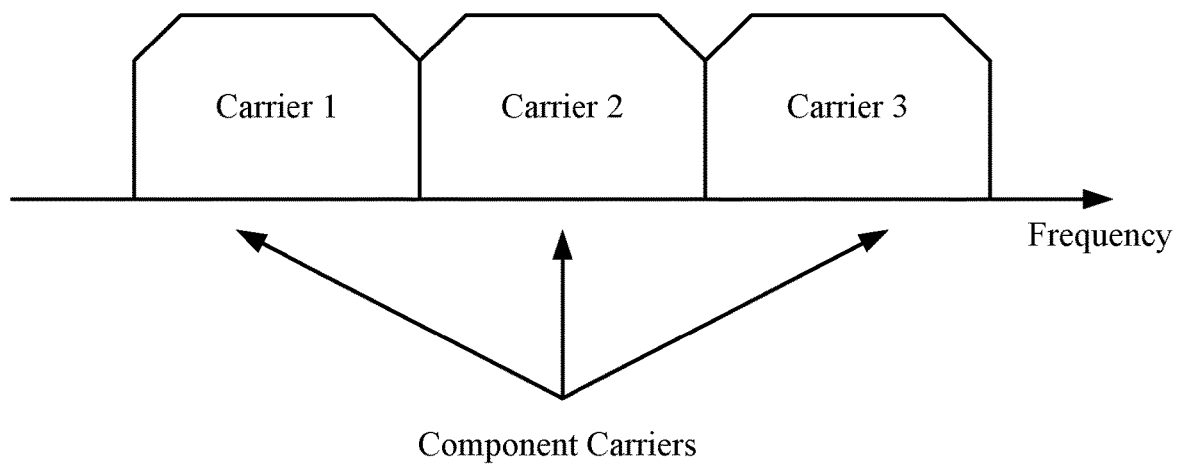
FIG. 7A illustrates an example continuous carrier aggregation type, according to certain aspects of the present disclosure.
Figure 7B:
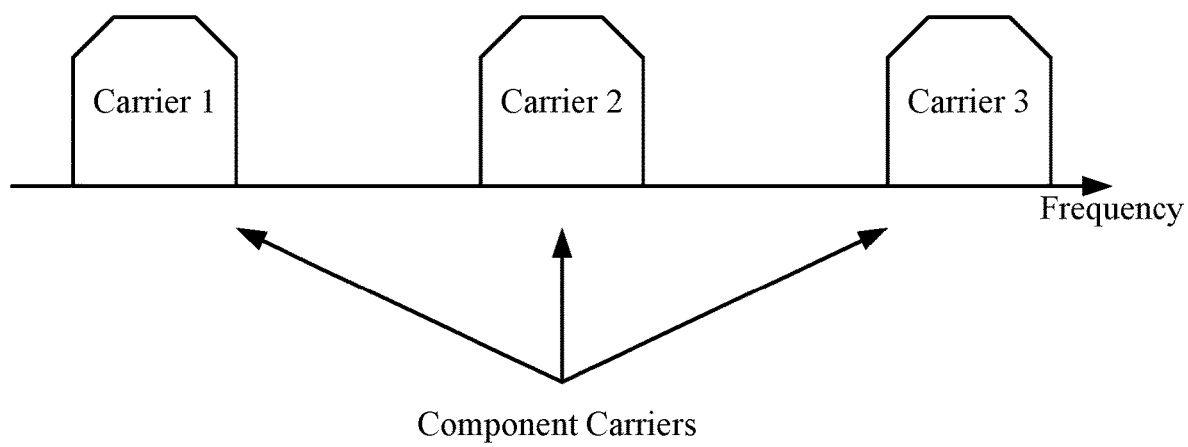
FIG. 7B illustrates an example non-continuous carrier aggregation type, according to certain aspects of the present disclosure.

Certain UEs may use spectrum of up to 20 MHz bandwidths allocated in a carrier aggregation of up to a total of 100 MHz (5 component carriers) used for transmission in each direction. For some mobile systems, two types of carrier aggregation (CA) methods have been proposed, continuous CA and non-continuous CA. They are illustrated in FIGS. 7A and 7B. Continuous CA occurs when multiple available component carriers are adjacent to each other (FIG. 7A). On the other hand, non-continuous CA occurs when multiple available component carriers are separated along the frequency band (FIG. 7B). Both non-continuous and continuous CA aggregates multiple component carriers to serve a single UE.

According to various aspects, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

Example Sounding Reference Signal (SRS) Transmission

A sounding reference signal (SRS) is a reference signal transmitted by a UE in the uplink direction. The SRS may be used by the base station (e.g., gNB or eNB 110) to estimate the uplink channel quality. For example, as illustrated in FIG. 1, a UE 120 may transmit SRS to an eNB 110. The eNB 110 may use this information to schedule uplink frequency resources for the UE. A special subframe generally refers to a subframe that serves as a switching point between downlink (DL) and uplink (UL) transmission, and may contain a downlink pilot time slot (DwPTS), a guard period (GP), and an uplink pilot time slot (UpPTS). The UpPTS may be used to transmit one or more SRSs.

Release-14 of the 3GPP standard introduced configuration for UpPTS having a fixed number of symbols (e.g., 6 symbols) corresponding to UpPTS for physical uplink shared channel (PUSCH) transmission with special subframe configuration 10. Release-13 of the 3GPP standard previously introduced additional SRS transmissions for UpPTS. For releases of 3GPP prior to release-14 (e.g., release-13), the length of UpPTS was not fixed, and depended on a special subframe configuration indicated to the UE via broadcast transmission and possibly additional parameters indicated to the UE via unicast transmission, as described in more detail herein. Therefore, the length of the UpPTS could vary to be 1 or 2 symbols based on a baseline indication via broadcast, or two or to four symbols based on an indication to the UE via unicast transmission.

FIG. 8 is a table 800 indicating information regarding SRS transmissions for a UpPTS. As illustrated, for subframe configurations 0-4, a baseline value of one symbol is indicated, and for configurations 5-9, a baseline value of two symbols is indicated. The baseline values may be used to determine assignment of symbols for SRS transmission. The baseline values may be indicated via a broadcast transmission in a system information block (SIB) broadcasted by an eNB (e.g., eNB 110). Moreover, for configurations 0-9, the variable "X" indicates additional symbols for SRS transmissions. For example, the configuration corresponding to variable X may be indicated to UEs via unicast transmission and indicate to use two or four additional symbols for SRS transmissions. In other words, the framework for SRS relies on two parts for UpPTS, a baseline UpPTS which may be determined based on the special subframe configuration being used, and an extended UpPTS corresponding to the X value in table 800. As illustrated, for the special configuration 10, the additional (extended) symbol indication is not present. The length of DwPTS and UpPTS given by table 800 is subject to the total length of DwPTS, GP and UpPTS being equal to $30720 \times T_s = 1$ ms, where Ts is a basic time unit, and where X is the number of additional single-carrier frequency-division multiple access scheme (SC-FDMA) symbols in UpPTS provided by a higher layer parameter (e.g., srs-UpPtsAdd parameter) if configured, otherwise X being equal to 0. As illustrated, the length of UpPTS with a normal cyclic prefix is 13152 $T_s$, which corresponds to 6 symbols.

FIGS. 9 and 10 are tables 900, 1000 used by UEs for the determination of SRS transmission. The table 900 is used for SRS not configured with additional SRS symbols in UpPTS, and table 1000 is used for SRS configured with additional SRS symbols in UpPTS. The table 900 indicates a subframe index $K_{SRS}$, which indicates the one or more symbols in the UpPTS to be assigned to one or more SRSs.

An eNB may signal which of the special subframe configurations described with respect to table 800 are to be used by a UE. For example, when an eNB signals a special subframe configuration 10, the eNB also signals one of two legacy special subframe configurations (e.g., configuration 0 or configuration 5). Therefore, UEs (e.g., legacy UEs) that may not understand the release-14 signaling of special subframe configuration 10, and thus need a fallback or legacy special subframe configuration, can use the signaling of the legacy special subframe configuration (e.g., one of configurations 0-9) for SRS transmission.

As described herein, the framework for SRS transmission relies on two parts for UpPTS, a baseline UpPTS and an extended UpPTS. However, with the inclusion of release-14 special subframe configuration 10, this framework is broken since special subframe configuration 10 corresponds to a fixed number of symbols for UpPTS. Different UEs may have different understanding of the special subframe configuration (legacy UEs will read configurations 0/5 and new UEs will read configuration 10), complicating the SRS scheduling. Moreover, a UE may be unable to determine the SRS resources from the tables 900 and 1000 described with respect to FIGS. 9 and 10, since special subframe configuration 10 is a special subframe configuration that has no baseline and extended UpPTS, or may be considered to have only a baseline UpPTS with a length of 6 symbols which is not supported by table 900. Certain aspects of the present disclosure provide techniques for performing SRS transmission by non-legacy UEs (e.g., UEs supporting release-14) in response to signaling from the eNB indicating special subframe configuration 10.

Figure 11:
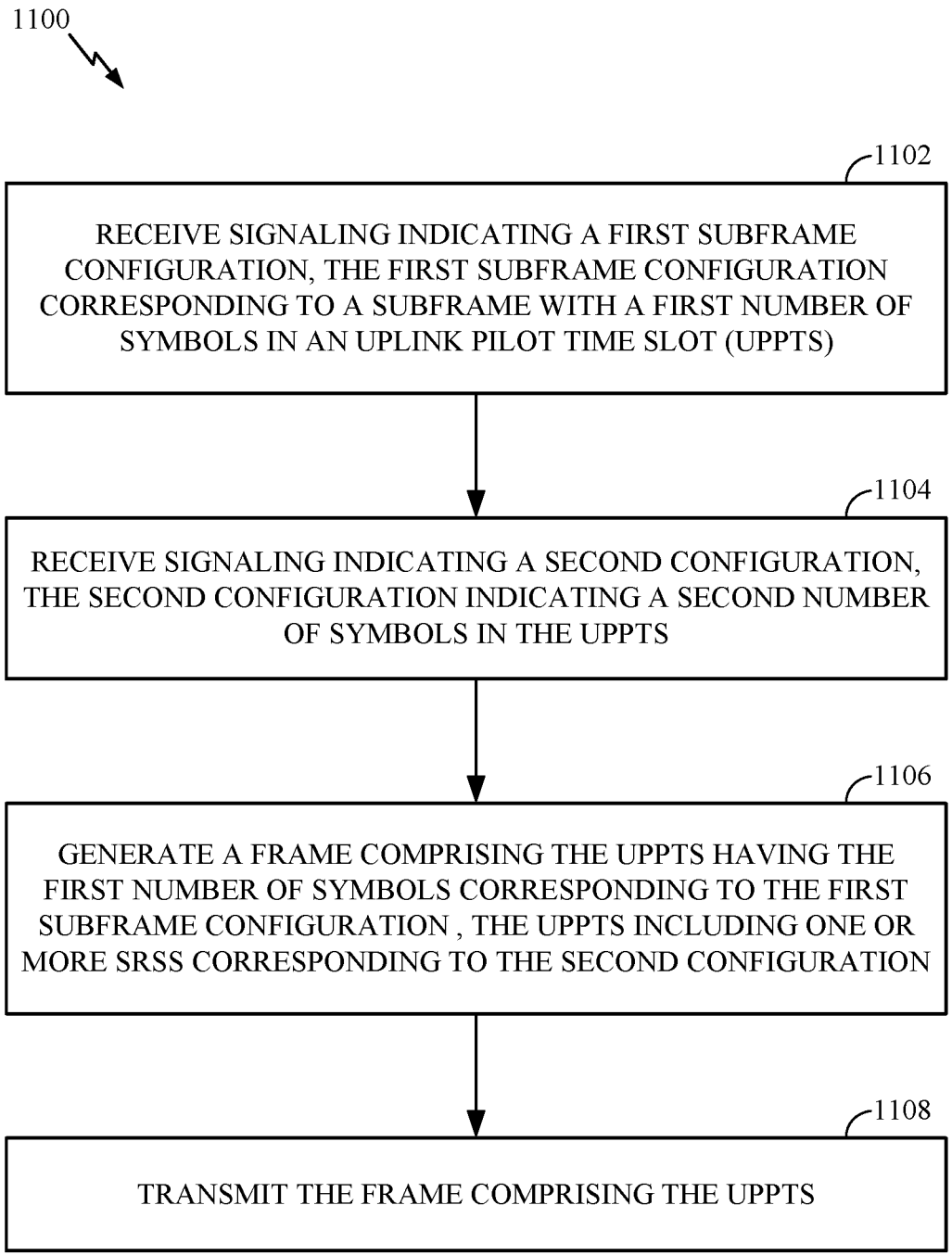
FIG. 11 illustrates example operations for wireless communication by a UE, in accordance with aspects of the present disclosure.

FIG. 11 is a flow diagram illustrating example operations 1100 for wireless communication, in accordance with certain aspects of the present disclosure. The operations 1100 may be performed, for example, by a UE (e.g., a non-legacy UE) such as the UE 120.

The operations 1100 begin, at block 1102, by receiving signaling indicating a first subframe configuration (e.g., special subframe configuration 10), the first subframe configuration corresponding to a subframe with a first number of symbols (e.g., 6 symbols) in a UpPTS, and at block 1104, receiving signaling indicating a second configuration (e.g., special subframe configuration 0 or 5), the second configuration indicating a second number of symbols in the UpPTS (e.g., to be used for determining a configuration for SRS transmission). At block 1106, the operations 1100 continue by generating a frame comprising the UpPTS having the first number of symbols corresponding to the first subframe configuration, the UpPTS including one or more SRSs corresponding to the second configuration, and at block 1108, transmitting the frame comprising the UpPTS.

For example, for SRS transmission, a UE that receives signaling from the eNB indicating special subframe configuration 10 (e.g., the first subframe configuration described with respect to FIG. 11) may fall back to the legacy signaled special subframe configuration (e.g., the second configuration described with respect to FIG. 11) such special subframe configuration 0. In other words, for SRS purposes, the UE follows legacy fields (e.g., for configurations 0 and 5), but for PUSCH purposes, the UE follows fields specific to configuration 10. For example, if the eNB signals special subframe configuration 0 (e.g., for legacy UEs), the non-legacy UE may assume 1 symbol for SRS transmission in a UpPTS having 6 symbols. For instance, if a non-legacy UE receives signaling indicating to use special subframe configuration 5, the UE may generate the UpPTS with 6 symbols corresponding to special subframe configuration 10, but assign two symbols of the UpPTS for SRS transmission. Thus, the UE may determine where to transmit SRS in the UpPTS based on whether eNB has signaled to use special subframe configuration 0 or special subframe configuration 5. For additional symbols in UpPTS, the UE will follow the unicast configuration (e.g., a unicast transmission from the eNB indicating extended SRS transmissions). For example, when the eNB signals fallback special subframe configuration 0 in a SIB, and signals two additional symbols for UpPTS via unicast for SRS purposes, the UpPTS length is 3 symbols (1 baseline symbol+2 additional symbols), but the UpPTS length may be 6 symbols in accordance with the special subframe configuration 10.

In other words, if a higher layer parameter (e.g., referred to as "specialSubframePatterns-v1430") indicates ssp10 (e.g., indicating to use special subframe configuration 10), or if the higher layer parameter (e.g., specialSubframePatterns-v1450) indicates ssp10-CRS-LessDwPTS (e.g., indicating to use special subframe configuration 10 without common reference signal (CRS) transmission on the 5th symbol of DwPTS), the UE may assume, for the purpose of transmitting SRS (e.g., determine subframe index $k_{SRS}$), that the special subframe configuration is that signaled by specialSubframePatterns (without suffix) (e.g., special subframe configuration 0 or 5 signaled for legacy UEs).

FIGS. 12 and 13 are tables 1200, 1300 representing parameters indicated for special subframe configuration 10 which may be added to explicitly indicate information regarding SRS transmission, in accordance with certain aspects of the present disclosure. For example, table 1200 is similar to table 900 described with respect to FIG. 9, but corresponding to special subframe configuration 10. The subframe index $k_{SRS}$ for the special subframe configuration 10 may indicate that the SRS is to be transmitted in the last two symbols of the UpPTS. Table 1300 is similar to table 1000 described with respect to FIG. 10, but corresponding to special subframe configuration 10 and indicating that the SRS is to be transmitted in the last two or four symbols of the UpPTS.

In certain aspects, the indication of the symbols for SRS transmission may be implied by the UE. For example, the UE may refer to the legacy parameters described with respect to FIGS. 9 and 10 and offset the assignment of the SRS symbols in the UpPTS such that the SRSs are transmitted in the last symbols of the UpPTS. For example, when table 900 indicates an SRS to be transmitted in the beginning two symbols, the UE may transmit SRS in the fifth and sixth symbols of the UpPTS instead, or start counting symbols from the third symbol of the UpPTS and assign the SRS transmissions accordingly.

In certain aspects, only additional SRS symbols may be supported. For example, when two or four additional SRS symbols are indicated by the unicast transmission (e.g., corresponding to table 1000), the UE may start counting from (e.g., assign the SRS transmissions to) the beginning of UpPTS. For example, the extra two symbols may use the beginning 2 symbols of the UpPTS, and extra four symbols may use the beginning four symbols of the UpPTS.

In certain aspects, SRS transmission may not be supported for the special subframe configuration 10. In certain aspects, an additional configuration (e.g., indicated via unicast or broadcast transmission) may be indicated by the eNB to the UE used to determine what special subframe configuration baseline (e.g., one or two symbols) to use for SRS, instead of following the legacy fallback parameter.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1

A method for wireless communication by a user-equipment (UE), comprising receiving signaling indicating a first subframe configuration, the first subframe configuration corresponding to a subframe with a first number of symbols in an uplink pilot time slot (UpPTS), receiving signaling indicating a second configuration, the second configuration indicating a second number of symbols in the UpPTS, generating a frame comprising the UpPTS having the first number of symbols corresponding to the first subframe configuration, the UpPTS including one or more sounding reference signals (SRSs) corresponding to the second configuration, and transmitting the frame comprising the UpPTS.

Embodiment 2

The method embodiment 1, wherein the second configuration corresponds to another subframe configuration with a fewer number of symbols in a UpPTS as compared to the first number of symbols indicated by the first subframe configuration to be included in the UpPTS of the subframe.

Embodiment 3

The method of any of embodiments 1 or 2, wherein the first number of symbols comprises six symbols.

Embodiment 4

The method of any of embodiments 1-3, wherein the second number of symbols is less than the first number of symbols.

Embodiment 5

The method of any of embodiments 1-4, wherein the first subframe configuration and the second configuration are signaled via the same broadcast transmission.

Embodiment 6

The method of embodiment 5, wherein the broadcast transmission comprises a system information block (SIB).

Embodiment 7

The method of any of embodiments 1-6, further comprising receiving another signaling indicating a number of additional symbols, wherein the one or more SRSs in the UpPTS are further generated based on the other signaling indicating the number of additional symbols.

Embodiment 8

The method of embodiment 7, wherein the other signaling is transmitted to the UE via a unicast transmission.

Embodiment 9

The method of any of embodiments 1-8, wherein the first subframe configuration and the second configuration are signaled via different transmissions.

Embodiment 10

The method of embodiment 9, wherein the first subframe configuration is signaled via a broadcast transmission and the second configuration is signaled via a unicast transmission to the UE.

Embodiment 11

The method of any of embodiments 1-10, wherein the one or more SRSs in the UpPTS generated based on the second configuration are assigned to one or more last symbols of the UpPTS for transmission.

Embodiment 12

The method of embodiment 11, wherein the assignment of the one or more SRSs to the one or more last symbols of the UpPTS is indicated by the second configuration.

Embodiment 13

The method of embodiment 11, wherein the second configuration indicates symbols to be used for transmitting at least one SRS by one or more legacy UEs in one or more symbols at a beginning of a UpPTS transmission.

Embodiment 14

An apparatus for wireless communication, comprising a receiver configured to receive signaling indicating a first subframe configuration, the first subframe configuration corresponding to a subframe with a first number of symbols in an uplink pilot time slot (UpPTS), and receive signaling indicating a second configuration, the second configuration indicating a second number of symbols in the UpPTS, a processing system configured to generate a frame comprising the UpPTS having the first number of symbols corresponding to the first subframe configuration, the UpPTS including one or more sounding reference signals (SRSs) corresponding to the second configuration, and a transmitter configured to transmit the frame comprising the UpPTS.

Embodiment 15

The apparatus of embodiment 14, wherein the second configuration corresponds to another subframe configuration with a fewer number of symbols in a UpPTS as compared to the first number of symbols indicated by the first subframe configuration to be included in the UpPTS of the subframe.

Embodiment 16

The apparatus of any of embodiments 14-15, wherein the first number of symbols comprises six symbols.

Embodiment 17

The apparatus of any of embodiments 14-16, wherein the second number of symbols is less than the first number of symbols.

Embodiment 18

The apparatus of any of embodiments 14-17, wherein the first subframe configuration and the second configuration are signaled via the same broadcast transmission.

Embodiment 19

The apparatus of embodiment 18, wherein the broadcast transmission comprises a system information block (SIB).

Embodiment 20

A computer-readable medium having instructions stored thereon to cause an apparatus to receive signaling indicating a first subframe configuration, the first subframe configuration corresponding to a subframe with a first number of symbols in an uplink pilot time slot (UpPTS), receive signaling indicating a second configuration, the second configuration indicating a second number of symbols in the UpPTS, generate a frame comprising the UpPTS having the first number of symbols corresponding to the first subframe configuration, the UpPTS including one or more sounding reference signals (SRSs) corresponding to the second configuration, and transmit the frame comprising the UpPTS.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
   receiving signaling indicating a first subframe configuration, the first subframe configuration corresponding to a subframe with a first number of symbols in an uplink pilot time slot (UpPTS);
   receiving signaling indicating a second configuration, the second configuration indicating a second number of symbols in the UpPTS of the subframe, wherein the second configuration corresponds to another subframe configuration with a fewer number of symbols in a UpPTS as compared to the first number of symbols of the UpPTS of the subframe corresponding to the first subframe configuration;
   generating a frame comprising the UpPTS having the first number of symbols corresponding to the first subframe configuration, the UpPTS including one or more sounding reference signals (SRSs) corresponding to the second configuration; and
   transmitting the frame comprising the UpPTS.

2. The method of claim 1, wherein the first number of symbols comprises six symbols.

3. The method of claim 1, wherein the second number of symbols is less than the first number of symbols.

4. The method of claim 1, wherein the first subframe configuration and the second configuration are signaled via the same broadcast transmission.

5. The method of claim 4, wherein the broadcast transmission comprises a system information block (SIB).

6. The method of claim 1, further comprising:
   receiving another signaling indicating a number of additional symbols, wherein the one or more SRSs in the UpPTS are further generated based on the other signaling indicating the number of additional symbols.

7. The method of claim 6, wherein the other signaling is transmitted to the UE via a unicast transmission.

8. The method of claim 1, wherein the first subframe configuration and the second configuration are signaled via different transmissions.

9. The method of claim 8, wherein the first subframe configuration is signaled via a broadcast transmission and the second configuration is signaled via a unicast transmission to the UE.

10. The method of claim 1, wherein the one or more SRSs in the UpPTS generated based on the second configuration are assigned to one or more last symbols of the UpPTS for transmission.

11. The method of claim 10, wherein the assignment of the one or more SRSs to the one or more last symbols of the UpPTS is indicated by the second configuration.

12. The method of claim 10, wherein the second configuration indicates symbols to be used for transmitting at least one SRS by one or more legacy UEs in one or more symbols at a beginning of a UpPTS transmission.

13. An apparatus for wireless communication, comprising:

a receiver configured to:
receive signaling indicating a first subframe configuration, the first subframe configuration corresponding to a subframe with a first number of symbols in an uplink pilot time slot (UpPTS); and
receive signaling indicating a second configuration, the second configuration indicating a second number of symbols in the UpPTS of the subframe, wherein the second configuration corresponds to another subframe configuration with a fewer number of symbols in a UpPTS as compared to the first number of symbols of the UpPTS of the subframe corresponding to the first subframe configuration;
a processing system configured to generate a frame comprising the UpPTS having the first number of symbols corresponding to the first subframe configuration, the UpPTS including one or more sounding reference signals (SRSs) corresponding to the second configuration; and
a transmitter configured to transmit the frame comprising the UpPTS.

14. The apparatus of claim 13, wherein the first number of symbols comprises six symbols.

15. The apparatus of claim 13, wherein the second number of symbols is less than the first number of symbols.

16. The apparatus of claim 13, wherein the first subframe configuration and the second configuration are signaled via the same broadcast transmission.

17. The apparatus of claim 16, wherein the broadcast transmission comprises a system information block (SIB).

18. A non-transitory computer-readable medium having instructions stored thereon to cause an apparatus to:
receive signaling indicating a first subframe configuration, the first subframe configuration corresponding to a subframe with a first number of symbols in an uplink pilot time slot (UpPTS);
receive signaling indicating a second configuration, the second configuration indicating a second number of symbols in the UpPTS of the subframe, wherein the second configuration corresponds to another subframe configuration with a fewer number of symbols in a UpPTS as compared to the first number of symbols of the UpPTS of the subframe corresponding to the first subframe configuration;
generate a frame comprising the UpPTS having the first number of symbols corresponding to the first subframe configuration, the UpPTS including one or more sounding reference signals (SRSs) corresponding to the second configuration; and
transmit the frame comprising the UpPTS.

* * * * *